(12) United States Patent
Berne

(10) Patent No.: US 11,724,574 B2
(45) Date of Patent: Aug. 15, 2023

(54) MOTOR VEHICLE HAVING A DARKENING DEVICE COVERING A DISPLAY DEVICE IN CLOSED POSITION

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 21 days.

(21) Appl. No.: 17/355,773

(22) Filed: Jun. 23, 2021

(65) Prior Publication Data
US 2021/0402856 A1    Dec. 30, 2021

(30) Foreign Application Priority Data

Jun. 25, 2020   (EP) ..................................... 20182371

(51) Int. Cl.
*B60J 1/20* (2006.01)
*B60R 11/04* (2006.01)
*B60R 25/10* (2013.01)

(52) U.S. Cl.
CPC .............. *B60J 1/2077* (2013.01); *B60R 11/04* (2013.01); *B60R 25/1012* (2013.01); *B60R 2300/205* (2013.01); *B60R 2300/8073* (2013.01)

(58) Field of Classification Search
None
See application file for complete search history.

(56) References Cited

U.S. PATENT DOCUMENTS

| | | | |
|---|---|---|---|
| 5,211,442 A | 5/1993 | Shikano | |
| 2006/0202501 A1* | 9/2006 | Tadakamalla | .......... B60J 1/2016 296/97.8 |
| 2007/0236364 A1* | 10/2007 | Hubbard | ................... B60R 1/00 348/148 |

(Continued)

FOREIGN PATENT DOCUMENTS

| | | |
|---|---|---|
| DE | 2617979 B1 | 9/1977 |
| EP | 1705042 A2 | 9/2006 |

(Continued)

OTHER PUBLICATIONS

Extended European Search Report for European Patent Application No. 20182371.3, dated Sep. 14, 2020, 8 pages.

*Primary Examiner* — Rebecca A Volentine
(74) *Attorney, Agent, or Firm* — Withrow & Terranova, PLLC

(57) ABSTRACT

The invention relates to a motor vehicle comprising a cab comprising a glass wall and an occultation system, the occultation system comprising a darkening device and being configured to allow the darkening device to move along a trajectory between an open position in which the darkening device does not obscure the glass wall and a closed position in which the darkening device obscures the glass wall, and a camera monitoring system comprising at least one camera configured to capture images of a scene outside the vehicle, and a display device configured to display the images captured by the camera, the display device being positioned in the cab, along the glass wall, wherein when the darkening device is in the closed position, the darkening device is configured to fully obscure the glass wall and to cover the display device.

12 Claims, 3 Drawing Sheets

(56) References Cited

U.S. PATENT DOCUMENTS

| | | | | |
|---|---|---|---|---|
| 2009/0179457 A1* | 7/2009 | Platto | ............... | B60H 1/0055 296/193.06 |
| 2017/0013188 A1* | 1/2017 | Kothari | ............... | B60J 3/0204 |
| 2019/0096340 A1* | 3/2019 | Todd | ............... | G09G 3/36 |
| 2020/0377041 A1* | 12/2020 | Sekizuka | ............... | B60R 13/0823 |

FOREIGN PATENT DOCUMENTS

| | | |
|---|---|---|
| JP | H10258636 A | 9/1998 |
| WO | 2020098903 A1 | 5/2020 |

* cited by examiner

MOTOR VEHICLE HAVING A DARKENING DEVICE COVERING A DISPLAY DEVICE IN CLOSED POSITION

The present application claims priority to European Patent Application No. 20182371.3, filed on Jun. 25, 2020, and entitled "A MOTOR VEHICLE HAVING A DARKENING DEVICE COVERING A DISPLAY DEVICE IN CLOSED POSITION," which is incorporated herein by reference in its entirety.

TECHNICAL FIELD

This disclosure pertains to the field of motor vehicles. In particular, this disclosure pertains to the field of motor vehicles comprising a darkening device and a display device, the darkening device being configured to cover the display device in a closed position.

BACKGROUND

In a motor vehicle, the cab constitutes a living space for the driver. When the driver is on a break, it is advantageous to be able to darken the cab to allow the driver to rest. In order to guarantee maximum driver comfort, it is preferable to be able to completely darken the cab.

The cab generally comprises a glass wall formed by the windshield and side windows. To allow the cab to be darkened, the cab usually includes a darkening device, such as a curtain, movable along a trajectory between an open position in which the darkening device does not obscure the glass wall and a closed position in which the darkening device obscures the glass wall, and thus darkens the cab.

The current motor vehicles are also usually provided with display devices to assist the driver in his driving. For example, some motor vehicles comprise a camera configured to capture images of a scene outside the vehicle, and a display device configured to display the images captured by the camera. However, the display devices are usually positioned in the cab, along the glass wall. The display device is therefore on the trajectory of the darkening device, and it hinders the closing of the darkening device.

To allow the darkening device to move to the closed position, it is known to surround the display device with the darkening device. The darkening device has then a specific shape and specific cut-outs related to the position of the display device along the glass wall. For example, the darkening device can include a notch enabling the darkening device to pass on either side of the display device in the closed position.

However, as the shape and the cut-outs of the darkening device have to be specific to the position of the display device in the vehicle, the darkening device is specific to a vehicle. Besides, the cut-outs of the darkening device allow light to pass around the display device, particularly below the display device, and the darkness created in the cab is unsatisfactory.

There is therefore a need to provide an easy to set up and adaptable solution to provide a satisfactory darkness in the cab.

SUMMARY

It is proposed a motor vehicle comprising:
a cab comprising a glass wall and an occultation system, the occultation system comprising a darkening device and being configured to allow the darkening device to move along a trajectory between an open position in which the darkening device does not obscure the glass wall and a closed position in which the darkening device obscures the glass wall,
a camera monitoring system comprising at least one camera configured to capture images of a scene outside the vehicle, and a display device configured to display the images captured by the camera, the display device being positioned in the cab, along the glass wall,
characterized in that when the darkening device is in the closed position, the darkening device is configured to fully obscure the glass wall and to cover the display device.

This way, as the darkening device covers the display device, that is, the darkening device goes over the display device, the display device no longer hinders the closing of the darkening device. No cut-outs are thus necessary in the darkening device to enable the darkening device to extend on either side of the display device in the closed position and no light goes around the display device.

Moreover, the darkening device makes it possible to fully obscure the glass wall when it is in the closed position. The entire glass wall is then covered by the darkening device. The darkening device covers the entire height and the entire width of the glass wall. The light coming from the outside of the cab to the inside of the cab through the glass wall is stopped by the darkening device, and the cab can thus be fully darkened.

Besides, as no cut-outs are formed in the darkening device, the darkening device can be used in all vehicles, regardless of the position of the display device along the glass wall in the cab.

The following features can be optionally implemented, separately or in combination one with the others.

According to one aspect, the occultation system comprises a control unit configured to detect a position of the darkening device and configured to control the display device depending on the position of the darkening device, so that the display device is switched off when the darkening device is in the closed position.

When the darkening device is in the closed position, the darkening device covers the display device, and the display device is thus no longer visible by a driver of the vehicle, and can therefore be switched off without any loss of information for the driver. Switching off the display allows the energy consumption of the vehicle to be reduced.

According to one alternative, the control unit is configured to detect the closed position of the darkening device and is configured to switch off the display device when the control unit detects that the darkening device is in the closed position.

Thus, the display device remains switched on as long as the darkening device is not in the closed position. The display device is switched off only when the darkening device is in the closed position. This ensures that if the darkening device is not completely closed, then the display device is not switched off and continues to display the images captured by the camera.

According to another alternative, the control unit is configured to detect that the darkening device is moved from the open position to the closed position and is configured to switch off the display device when the control unit detects that the darkening device is moved from the open position to the closed position.

Thus, the display device can be switched off before it reaches the closed position.

According to one aspect, the occultation system comprises a rail on which the darkening device is slidably attached and the control unit comprises at least one sensor disposed on the rail and configured to detect the position of the darkening device.

The sensor can thus detect when the darkening device is slid on the rail.

According to one aspect, the at least one sensor is a switch configured to detect when the darkening device is slid over the switch and to switch off the display device when the darkening device is slid over the switch.

Thus, the sensor also acts as an actuator and can trigger the display device to switch off.

According to one aspect, the rail is disposed above the glass wall and the darkening device comprises an upper edge and a lower edge opposed to the upper edge, the darkening device being slidably attached by the upper edge to the rail and the lower edge being a free lower edge extending below the glass wall.

According to one aspect, the display device is disposed below the rail and the sensor is aligned with the display device so that the display device is switched off when the darkening device reaches the display device.

Thus, the display device is switched off once the darkening device covers the display device. It ensures that the display device is switched off once it is covered by the darkening device and is then not visible for the driver, even if the darkening device has not reached its closed position. This further reduces power consumption of the vehicle.

According to one aspect, among the at least one sensor, the control unit comprises a first sensor and a second sensor disposed on the rail and configured to detect the position of the darkening device.

The display device can thus be switched off only when the first sensor and the second sensor detect the sliding of the darkening device. In particular, if the darkening device is located between the first sensor and the second sensor, then the display device is not switched off.

According to one aspect, the display device is disposed on a pillar of the cab. Alternatively, the motor vehicle comprises a windshield and the display device is disposed on at the center and on the top or on the bottom of the windshield.

According to one aspect, the motor vehicle comprises an additional display device positioned in the cab, out of the trajectory of the darkening device, and configured to display images captured by the camera of the monitoring system when the darkening device is in the closed position.

The additional display device is positioned so as not to be obscured by the darkening device when the darkening device is in the closed position. It allows the driver to see the scene outside the vehicle.

According to one aspect, the cab comprises a dashboard and the additional display device is disposed on the dashboard.

According to one aspect, the darkening device comprises a first side curtain and a second side curtain or a single side curtain.

BRIEF DESCRIPTION OF DRAWINGS

Other features, details and advantages will be shown in the following detailed description and on the figures, on which.

DESCRIPTION OF EMBODIMENTS

In the figures, the same references denote identical or similar elements. For sake of clarity, various elements may not be represented at scale.

In the description, the longitudinal direction L is defined as the direction from the rear to the front of the vehicle when considering the normal direction of travel of the vehicle, the transverse direction T is defined as the direction perpendicular to the longitudinal direction and from one side of the vehicle to the other, and the vertical direction V is defined from bottom to top, as the direction perpendicular to the longitudinal direction and to the transverse direction.

Figure 1:
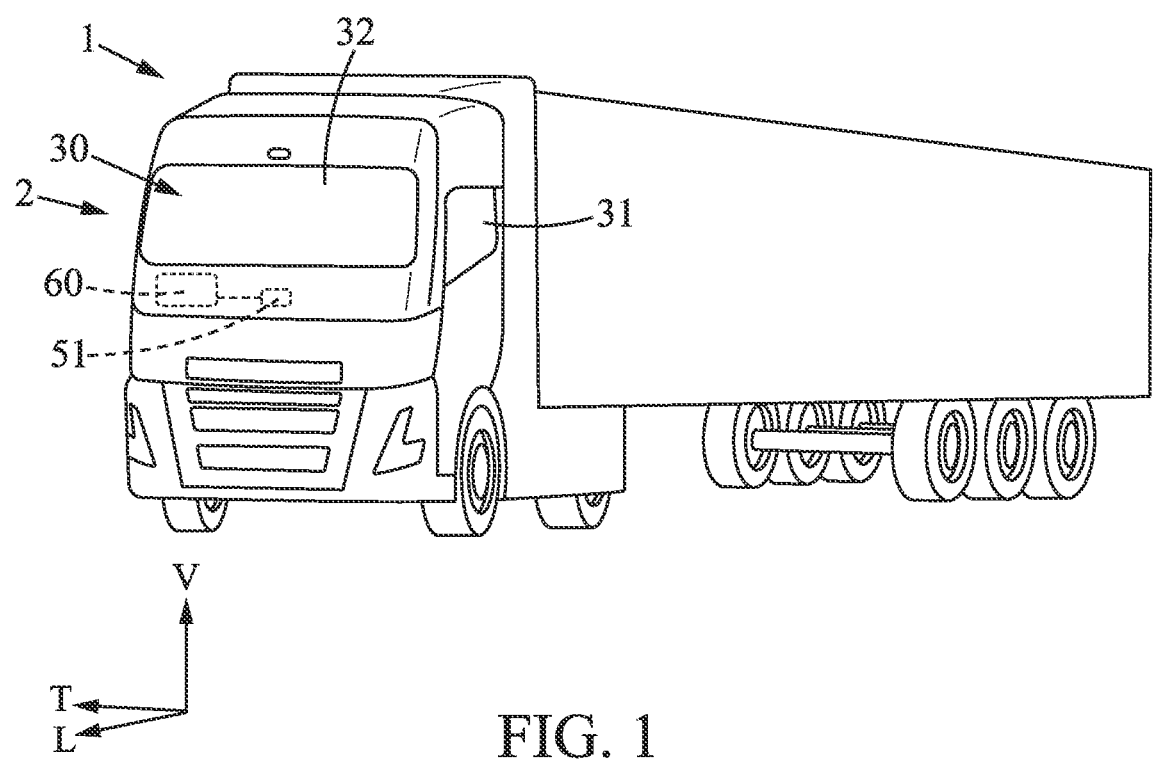
FIG. 1 illustrates a side view of a truck comprising a cab.

FIG. 1 shows a truck 1 comprising a cab 2 and a camera monitoring system comprising a camera 51 enabling to capture images of a scene outside the truck 1.

Although the description presents a truck 1 as a motor vehicle, it is understood that the invention applies to any type of motor vehicle such as a car, a bus or any other ground vehicle.

The cab 2 comprises a windshield 32, a first side window 31 and a second side window 33. Only the first side window 31 is visible on FIG. 1, the second side window 33 is visible on FIGS. 2 and 3. The windshield 32 and the first and second side windows 31, 33 form a glass wall 30.

The cab 2 also comprises an occultation system 40 comprising a darkening device 41 and a rail 44. The rail 44 is disposed above the glass wall 30 and runs along the entire upper edge of the glass wall 30.

Figure 2:
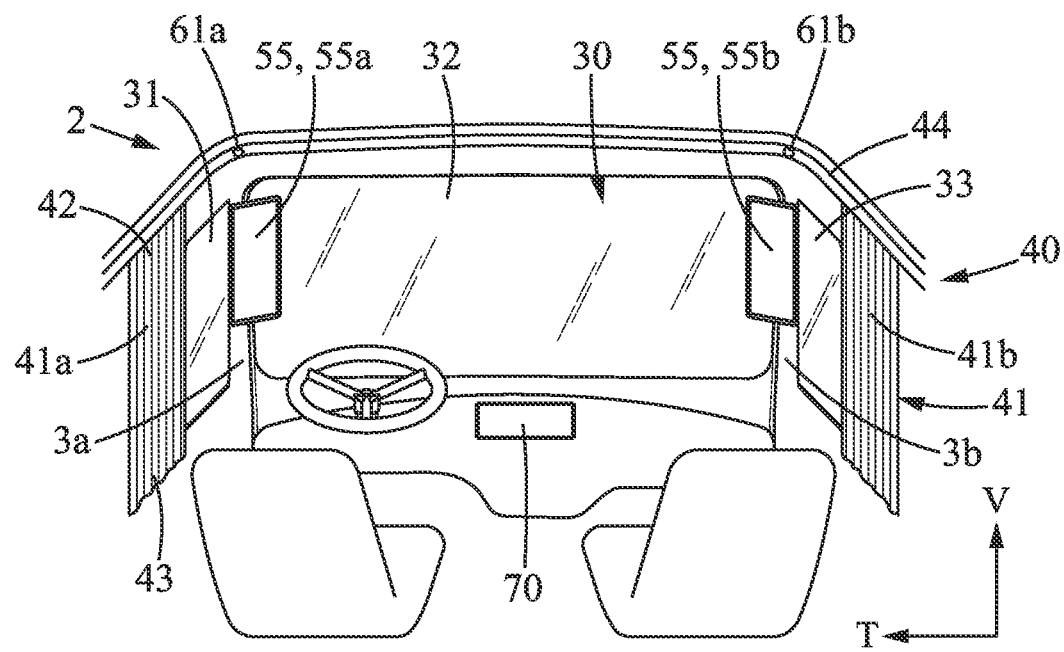
FIG. 2 illustrates the inside of the cab of the truck of FIG. 1, the cab comprising a glass wall and an occultation system with a darkening device in an open position, according to a first alternative.

According to a first alternative represented on FIG. 2, the darkening device 41 comprises a first side curtain 41a and a second side curtain 41b slidably attached to the rail 44. The first side curtain 41a and the second side curtain 41b each comprise an upper edge 42 and a lower edge 43 opposed to the upper edge 42. The first side curtain 41a and the second side curtain 41b are slidably attached by the upper edge 42 to the rail 44. The lower edge 43 of the first side curtain 41a and of the second side curtain 41b is a free lower edge and extends below the glass wall 30.

Figure 3:
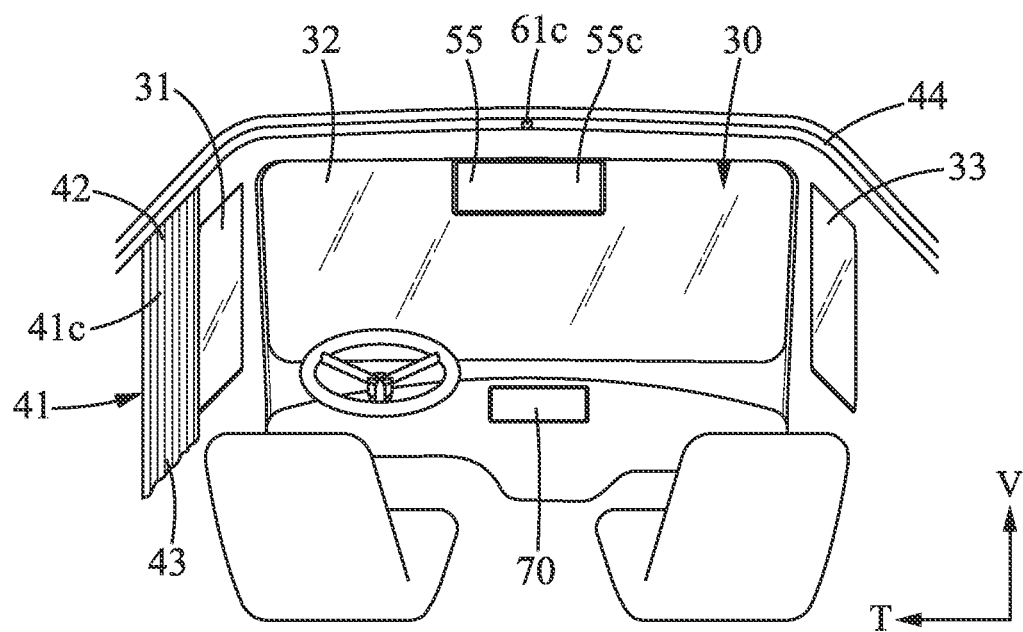
FIG. 3 illustrates the inside of the cab of the truck of FIG. 1, the cab comprising a glass wall and an occultation system with a darkening device in an open position, according to a second alternative.

According to a second alternative represented on FIG. 3, the darkening device 41 comprises a single side curtain 41c slidably attached to the rail 44. As for the first side curtain 41a and the second side curtain 41b, the single side curtain 41c comprises an upper edge 42 and a lower edge 43 opposed to the upper edge 42. The single side curtain 41c is slidably attached by the upper edge 42 to the rail 44. The lower edge 43 of the single side curtain 41c is a free lower edge and extends below the glass wall 30.

In the first and second alternatives, the darkening device 41 extends from the upper edge which is slidably attached to the rail 44 which is disposed above the glass wall 30 to the free lower edge which extends below the glass wall 30. The darkening device 41 thus extends along the entire height of the glass wall 30.

In a non-represented alternative, the occultation system 40 could comprise a darkening device 41 formed by a roller curtain attached above the glass wall 30 and rails disposed on lateral ends of the first and second side windows 31, 33 and on lateral ends of the windshield 32. The roller curtain could comprise a first side curtain attached above the first side window 31 and that can be guided along the rails disposed on lateral ends of the first side window 31, a second side curtain attached above the second side window 33 and that can be guided along the rails disposed on lateral ends of the second side windows 33 and a central curtain attached above the windshield 32 and that can be guided along the rails disposed on lateral ends of the windshield 32.

The occultation system 40 allows the darkening device 41 to be movable along a trajectory between an open position in which the darkening device 41 does not obscure the glass wall 30 and a closed position in which the darkening device 41 obscures the glass wall 30. The darkening device 41 can be slid in the rail 44 between the open position and the closed position.

In FIGS. 2 and 3, the darkening device 41 is represented in the open position. The darkening device 41 does not cover the glass wall 30.

The camera monitoring system also comprises a display device 55 positioned in the cab 2, that displays the images of the scene outside the truck 1 captured by the camera 51 of the camera monitoring system.

In the first alternative, the display device 55 comprises a first side screen 55a and a second side screen 55b. The first side screen 55a is disposed on a first pillar 3a of the truck 1 and the second side screen 55b is disposed on a second pillar 3b of the truck 1. The first side screen 55a and the second side screen 55b are disposed below the rail 44. The first side screen 55a and the second side screen 55b extend along the glass wall 30. A part of the first side screen 55a extends facing the glass wall 30 and a part of the second side screen 55b extends facing the glass wall 30.

In the second alternative, the display device 55 comprises a central screen 55c disposed on the windshield 32. The central screen 55c extends along the glass wall 30, facing the windshield 32.

Figure 4:
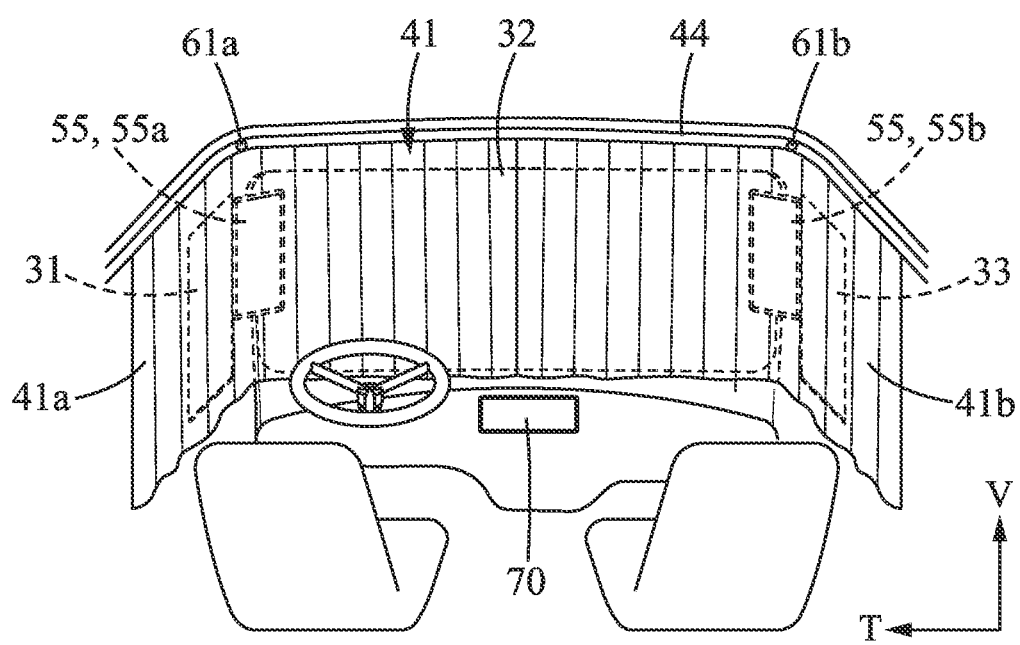
FIG. 4 illustrates the inside of the cab of FIG. 2 in which the darkening device is in a closed position.

In FIG. 4, the darkening device 41 is represented in the closed position. In the closed position, the darkening device 41 fully obscures the glass wall 30. The entire glass wall 30 is covered by the darkening device 41. The darkening device 41 covers the entire height and the entire width of the glass wall 30.

The darkening device 41 also covers the display device 55. The rail 44 is disposed upstream the display device 55 along the longitudinal direction, and allows the darkening device 41 to pass over the display device 55. the display device 55 does not hinder the closing of the darkening device 41. The darkening device 41 goes over the display device 55. The light coming from the outside of the cab 2 to the inside of the cab 2 through the glass wall 30 is stopped by the darkening device 41, and the cab 2 can thus be fully darkened.

FIG. 4 shows the darkening device 41 with the first side curtain 41a and the second side curtain 41b and the display device 55 with the first side screen 55a and the second side screen 55b corresponding to the first alternative. It is understood that the darkening device 41 with the single side curtain 41c and the display device 55 with the central screen 55c of the second alternative or any other alternative may also be suitable.

In particular, FIG. 4 shows that the first side curtain 41a covers the first side screen 55a and the second side curtain 41b covers the second side screen 55b. In the second alternative, the single side curtain 41c would cover the central screen 55c.

It is understood that the first and second alternatives may be combined without going beyond the scope of the invention. In particular, the darkening device 41 with the first side curtain 41a and the second side curtain 41b according to the first alternative could be used to cover the display device 55 with the central screen 55c according to the second alternative. And conversely, the darkening device 41 with the single side curtain 41c according to the second alternative could cover the display device 55 with the first side screen 55a and the second side screen 55b according to the first alternative.

The occultation system 40 also comprises a control unit 60 which can detect a position of the darkening device 41. The control unit 60 controls the display device 55 depending on the position of the darkening device 41, so that the display device 55 is switched off when the darkening device 41 is in the closed position. The control unit 60 comprises at least one sensor to detect the position of the darkening device 41.

In the first alternative shown on FIG. 2, the control unit 60 comprises a first switch 61a and a second switch 61b each disposed on the rail 44. The first switch 61a is aligned with the first side screen 55a and the second switch 61b is aligned with the second side screen 55b.

The first switch 61a can detect when the first side curtain 41a is slid over the first switch 61a and the second switch 61b can detect when the second side curtain 41b is slid over the second switch 61b. The first switch 61a switches off the first side screen 55a when the first side curtain 41a slides over the first switch 61a, and the second switch 61b switches off the second side screen 55b when the second side curtain 41b slides over the second switch 61b.

Hence, the first side screen 55a is switched off when the first side curtain 41a reaches the first side screen 55a, and the second side screen 55b is switched off when the second side curtain 41b reaches the second side screen 55b.

In the second alternative shown on FIG. 3, the control unit 60 comprises a single switch 61c disposed on the rail 44. The single switch 61c is aligned with the central screen 55c. The single switch 53c can detect when the single side curtain 41c is slid over the single switch 53c. The single switch 61c switches off the central screen 55c when the single side curtain 41c slides over the single switch 61c.

Thanks to the first switch 61a and the second switch 61b, or the single switch 61c, the control unit 60 can detects that the darkening device 41 is moved from the open position to the closed position and switches off the display device 55 when the darkening device 41 is moved from the open position to the closed position. So, when the darkening device 41 is in closed position, the display device 55 is switched off. As the display device 55 is covered by the darkening device 41 when the darkening device 41 is in the closed position, the images displayed on the display device 55 are no longer visible for a driver inside the cab 2. So switching off the display device 55 enables to reduce the energy consumption of the truck 1 without any loss of information for the driver.

It is understood that the switches in the first and second alternatives could have a different location. In particular, the switches could be positioned at the end of the trajectory of the darkening device 41, or between the display device 55 and the end of the trajectory of the darkening device 41.

Besides, in the first alternative, a single switch could be disposed on the rail 44. The single switch could switch off the first side screen 55*a* and the second side screen 55*b*. In the second alternative, two switches could be disposed on the rail 44. The central screen 55*c* could be switched off only when the two switches detect that the single side curtain 41*c* is moved from the open position to the closed position.

The occultation system 40 could be coupled with a fold away system (not showed) for the display device. This ensures better coverage and motion of the darkening device 41.

The control unit 60 could also comprise other sensors than switches, which only detect that the darkening device is moved from the open position to the closed position and that transmit the position of the darkening device to the control unit 60. The control unit 60 could then switch off the display device 55.

Alternatively, the control unit 60 could detect the closed position of the darkening device 41 and switch off the display device 55 when the darkening device 41 is in the closed position.

The truck 1 comprises an additional display device 70 positioned on the cab 2. The additional display device 70 is disposed on the dashboard 5 of the truck 1. The additional display device 70 is disposed out of the trajectory of the darkening device 41. So when the darkening device 41 is moved from the open position to the closed position, the additional display device 70 does not hinder the trajectory of the darkening device 41.

Besides, when the darkening device 41 is in the closed position, the additional display device 70 is not covered by the darkening device 41. The additional display device 70 is thus visible for the driver regardless the position of the darkening device 41. The additional display device 70 can display images captured by the camera 51 when the darkening device 41 is in the closed position. Hence, when the darkening device 41 is in the closed position, even though the display device 55 is covered by the darkening device 41 and is not visible for the driver, the additional display device 70 can display the images captured by the camera 51 or by any other camera or sensor that can comprise the camera monitoring system. The driver can thus still see the scene outside the truck 1 when the darkening device 41 is in the closed position.

The invention claimed is:

1. A motor vehicle comprising:
a cab comprising a glass wall and an occultation system, the glass wall comprising a windshield and a side window, the occultation system comprising a darkening device and being configured to allow the darkening device to move along a trajectory between an open position in which the darkening device does not obscure the glass wall and a closed position in which the darkening device obscures at least a portion of the side window and at least a portion of the windshield of the glass wall,
a camera monitoring system comprising at least one camera configured to capture images of a scene outside the vehicle, and a display device configured to display the images captured by the camera, the display device being positioned in the cab, along the glass wall, and
wherein when the darkening device is in the closed position, the darkening device is configured to obscure the at least a portion of the side window and the at least a portion of the windshield of the glass wall and to cover the display device, and
wherein the occultation system comprises a control unit configured to detect a position of the darkening device and configured to control the display device depending on the position of the darkening device.

2. The motor vehicle of claim 1, wherein the control unit is configured to control the display device so that the display device is switched off when the darkening device is in the closed position.

3. The motor vehicle of claim 2, wherein the control unit is configured to detect the closed position of the darkening device and is configured to switch off the display device when the control unit detects that the darkening device is in the closed position.

4. The motor vehicle of claim 2, wherein the control unit is configured to detect that the darkening device is moved from the open position to the closed position and is configured to switch off the display device when the control unit detects that the darkening device is moved from the open position to the closed position.

5. The motor vehicle of claim 1, wherein the occultation system comprises a rail on which the darkening device is slidably attached and the control unit comprises at least one sensor disposed on the rail and configured to detect the position of the darkening device.

6. The motor vehicle of claim 5, wherein the at least one sensor is a switch configured to detect when the darkening device is slid over the switch and to switch off the display device when the darkening device is slid over the switch.

7. The motor vehicle of claim 5, wherein the rail is disposed above the glass wall and the darkening device comprises an upper edge and a lower edge opposed to the upper edge, the darkening device being slidably attached by the upper edge to the rail and the lower edge being a free lower edge extending below the glass wall.

8. The motor vehicle of claim 7, wherein the display device is disposed below the rail and wherein the sensor is aligned with the display device so that the sensor is switched off when the darkening device reaches the display device.

9. The motor vehicle of claim 5, wherein among the at least one sensor, the control unit comprises a first sensor and a second sensor disposed on the rail and configured to detect the position of the darkening device.

10. The motor vehicle of claim 1, wherein the display device is disposed on a pillar of the cab.

11. The motor vehicle of claim 1, further comprising an additional display device positioned in the cab, out of the trajectory of the darkening device, and configured to display images captured by the camera of the monitoring system when the darkening device is in the closed position.

12. The motor vehicle of claim 11, wherein the cab comprises a dashboard and wherein the additional display device is disposed on the dashboard.

* * * * *